(12) United States Patent
Stefanski et al.

(10) Patent No.: US 9,242,292 B2
(45) Date of Patent: Jan. 26, 2016

(54) COMPOSITION OF A CERAMIC LAYER FOR MANUFACTURING A CASTING MOULD AND OTHER PRODUCTS

(71) Applicant: INSTYTUT ODLEWNICTWA, Cracow (PL)

(72) Inventors: Zbigniew Stefanski, Cracow (PL); Aleksander Karwinski, Cracow (PL); Irena Izdebska-Szanda, Cracow (PL)

(73) Assignee: The Instytut Odlewnictwa, Cracow (PL)

( * ) Notice: Subject to any disclaimer, the term of this patent is extended or adjusted under 35 U.S.C. 154(b) by 0 days.

(21) Appl. No.: 14/432,949

(22) PCT Filed: May 27, 2014

(86) PCT No.: PCT/IB2014/000904
§ 371 (c)(1),
(2) Date: Apr. 1, 2015

(87) PCT Pub. No.: WO2014/203052
PCT Pub. Date: Dec. 24, 2014

(65) Prior Publication Data
US 2015/0246389 A1 Sep. 3, 2015

(30) Foreign Application Priority Data
Jun. 17, 2013 (PL) .......................... 404355

(51) Int. Cl.
| | |
|---|---|
| *B22C 1/00* | (2006.01) |
| *C04B 35/16* | (2006.01) |
| *B22C 3/00* | (2006.01) |
| *C04B 35/20* | (2006.01) |
| *B32B 18/00* | (2006.01) |
| *C04B 35/18* | (2006.01) |
| *C04B 35/195* | (2006.01) |
| *B22C 7/02* | (2006.01) |
| *B22C 9/04* | (2006.01) |

(52) U.S. Cl.
CPC ... *B22C 3/00* (2013.01); *B22C 1/00* (2013.01); *B32B 18/00* (2013.01); *C04B 35/18* (2013.01); *C04B 35/195* (2013.01); *C04B 35/20* (2013.01); *B22C 7/02* (2013.01); *B22C 9/04* (2013.01); *C04B 2235/3206* (2013.01); *C04B 2235/3208* (2013.01); *C04B 2235/3244* (2013.01); *C04B 2235/3272* (2013.01); *C04B 2235/3418* (2013.01); *C04B 2235/3427* (2013.01); *C04B 2235/3436* (2013.01); *C04B 2235/3445* (2013.01); *C04B 2235/3454* (2013.01); *C04B 2235/3481* (2013.01); *C04B 2235/5427* (2013.01); *C04B 2235/5445* (2013.01); *C04B 2235/6028* (2013.01); *C04B 2235/728* (2013.01); *C04B 2235/80* (2013.01); *C04B 2237/341* (2013.01); *C04B 2237/58* (2013.01)

(58) Field of Classification Search
CPC ............ B22C 1/00; B22C 3/00; B22C 9/00; B22C 9/02; B22C 9/04; C04B 35/16; C04B 35/195; C04B 35/6316
USPC .......................................... 106/38.22, 38.27
See application file for complete search history.

(56) References Cited

U.S. PATENT DOCUMENTS

| | | | | |
|---|---|---|---|---|
| 3,437,131 | A * | 4/1969 | Ornitz ........................... | 164/298 |
| 4,154,894 | A * | 5/1979 | Bushey ......................... | 428/404 |
| 4,604,140 | A * | 8/1986 | Lalancette et al. ........... | 106/38.9 |
| 5,355,930 | A * | 10/1994 | Donahue et al. ............... | 164/34 |
| 5,355,931 | A * | 10/1994 | Donahue et al. ............... | 164/34 |
| 8,030,236 | B2 * | 10/2011 | Klischat et al. ............... | 501/122 |
| 8,691,172 | B2 * | 4/2014 | DeSanto et al. .............. | 423/331 |

* cited by examiner

*Primary Examiner* — Anthony J Green
(74) *Attorney, Agent, or Firm* — Barnes & Thornburg LLP

(57) ABSTRACT

A composition of a ceramic layer for manufacturing a casting mould and other products, in particular intended for making castings by investment casting, comprising a liquid ceramic mass consisting of, in weight %, 50-75% of a ceramic material which is a mixture with particle-size distribution comprising minimum 90% of particles of size less than 0.04 mm, having the following phase composition: 30-90% of forsterite $Mg_2SiO_4$, 5-15% of fayalite $Fe_2SiO_4$ and 5-65% of a mixture of phase components such as chrysolite $2(Mg_{0.88}Fe_{0.12})SiO_2$, enstatite $MgSiO_3$, tremolite $Ca_2Mg_5Si_8O_{22}(OH)_2$, ringwoodite $(Mg,Fe)_2$, diopside $Ca(Mg,Al)(Si,Al)_2O_6$ and others, and of 25-50% of a binder comprising an aqueous or aqueous-organic colloidal solution of a metallic oxide and modifiers, and a ceramic material for sprinkling which is a mixture having the following phase composition, in weight %: 30-90% of forsterite $Mg_2SiO_4$, 5-15% of fayalite $Fe_2SiO_4$, and 5-65% of a mixture of phase components such as chrysolite $2(Mg_{0.88}Fe_{0.12})SiO_2$, enstatite $MgSiO_3$, tremolite $Ca_2Mg_5Si_8O_{22}(OH)_2$, ringwoodite $(Mg,Fe)_2$, diopside $Ca(Mg,Al)(Si,Al)_2O_6$ and others.

5 Claims, No Drawings

COMPOSITION OF A CERAMIC LAYER FOR MANUFACTURING A CASTING MOULD AND OTHER PRODUCTS

CROSS-REFERENCE TO RELATED APPLICATIONS

This application is a national stage entry under 35 USC §371(b) of PCT International Application No. PCT/IB 2014/000904, filed May 27, 2014, and claims the benefit of Poland Patent Application No. P. 404355, filed on Jun. 17, 2013, both of which are expressly incorporated by reference herein.

The invention relates to a composition of a ceramic layer for manufacturing a casting mould and other products, in particular intended for making castings by investment casting.

One of the main conditions for obtaining castings with excellent technological properties is inducing the so-called directional and rapid solidification and self-cooling of them in a casting mould, instead of an undesirable slow volumetric solidification process. Directional solidification allows obtaining a compact and fine-grained structure of castings without casting defects such as contraction cavities or shrinkage porosity, which guarantees excellent technological properties. It is particularly important for structurally complex castings, with variable thickness of walls and having to meet high technological requirements. This also results in a reduced number of defective products. One of the methods that enables directional solidification of a casting is filling cold casting moulds with liquid metal, which is difficult in the case of castings made by investment casting.

In the known technology of making castings by investment casting in self-supported moulds, one of the basic operations is baking the obtained ceramic moulds at a high temperature, 900-1200° C., with the aim to obtain the required high strength of the obtained mould's ceramic as a result of its sintering as well as to burn out all organic remnants. Practically, in this technology the baked and still hot moulds are directly filled with liquid metal. In this technology, the most frequently used ceramic material is inexpensive quartz, but due to its physical properties moulds must be filled with liquid metal immediately after baking when their temperature is still between 900° C. and 1200° C. Due to the high temperature of the casting mould being filled, the solidification and self-cooling of the metal is of undesirable volumetric nature and the castings have less favorable technological properties. However, lowering the temperature of moulds before filling them to induce directional solidification would result in cracking and destruction of moulds while filling them, which is associated with substantial dimensional changes in quartz ceramic due to temperature variations, as well as with transformations in the crystallographic lattice of a quartz matrix occurring while the temperature is lowered. For that reason, when making reliable castings that are structurally complex, have variable thickness of walls, and the required excellent properties, casting moulds in this technology are made of a ceramic material that is much more expensive than quartz, such as zirconium or aloxite; ceramic moulds after baking are cooled to the temperature required by the specific technology, usually to about 300° C., and they are not damaged.

Self-supported casting moulds made of a composition comprising a quartz ceramic matrix are not particularly advantageous for making castings of aluminum alloys due to technological reasons associated with the volumetric nature of their solidification. They cannot be used to make castings of magnesium alloys due to the high affinity of magnesium to oxygen present in silica. When moulds are being filled with liquid magnesium alloy, the alloy's oxidation may lead to its inflammation; moreover, during chemical reactions that take place, silicon migrates to magnesium alloy as a harmful element.

Known compositions of a ceramic layer for manufacturing a casting mould and other products consist of a liquid ceramic mass and a ceramic material with suitable particle-size distribution, that meets technological requirements. The ceramic material is sprinkled onto the liquid ceramic mass already applied onto the model, upon drying, both components form a single layer of the manufactured ceramic mould. Moulds are typically made of several to a dozen or so layers. The subsequent technological operations comprise removing the model by melting it, drying the moulds and then baking them at high temperatures, most frequently from 900° C. to 1200° C.

The description of PL145903 discloses a composition for layers of a self-supported ceramic mould made by investment casting which consists of a ceramic material in the form of mullite and a binder being an aqueous solution of chromium aluminium phosphate.

According to the present invention, a composition of a ceramic layer for manufacturing a casting mould and other products, in particular intended for making castings by investment casting, comprising a liquid ceramic mass and a ceramic material for sprinkling is characterized in that it comprises a liquid ceramic mass consisting of, in weight %, 50-75% of a ceramic material which is a mixture with particle-size distribution comprising minimum 90% of particles of size less than 0.04 mm, and the following phase composition: 30-90% of forsterite $Mg_2SiO_4$, 5-15% of fayalite $Fe_2SiO_4$, and 5-65% of a mixture of phase components such as chrysolite $2(Mg_{0.88}Fe_{0.12})SiO_2$, enstatite $MgSiO_3$, tremolite $Ca_2Mg_5Si_8O_{22}(OH)_2$, ringwoodite $(Mg,Fe)_2$, diopside $Ca(Mg,Al)(Si,Al)_2O_6$, and others, and of 25-50% of a binder comprising an aqueous or aqueous-organic colloidal solution of a metallic oxide and modifiers, and the ceramic material for sprinkling which is a mixture having the following phase composition, in weight %: 30-90% of forsterite $Mg_2SiO_4$, 5-15% of fayalite $Fe_2SiO_4$ and 5-65% of a mixture of phase components such as chrysolite $2(Mg_{0.88}Fe_{0.12})SiO_2$, enstatite $MgSiO_3$, tremolite $Ca_2Mg_5Si_8O_{22}(OH)_2$, ringwoodite $(Mg,Fe)_2$, diopside $Ca(Mg,Al)(Si,Al)_2O_6$, and others. According to the present invention, the composition of a ceramic layer for manufacturing a casting mould and other products, in particular intended for making castings by investment casting is characterized in that the content of $SiO_2$ in the ceramic material is maximum 25% by weight, expressed as Si element.

Ceramic products, in particular casting moulds and other products, are made of several to a dozen or so layers, the optimum number being from two to eight. The moulds made of the composition according to the present invention are used to make castings of brass, bronze, cast iron, cast steel, and in particular aluminium or magnesium alloys.

Moulds and other products made of the composition of a ceramic layer for manufacturing a casting mould and other products, according to the invention, after being initially baked at the temperature from 800° C. to 1250° C. are cooled to the ambient temperature or to any temperature below 300° C. as required by the applicable technology and then are filled with liquid metal without the risk of damaging them. Casting moulds made of the composition according to the present invention ensure directional solidification and self-cooling of castings, which is advantageous for their quality. Ensuring directional solidification in such moulds enables using them for casting thin-walled products and products of complex shapes. Thanks to the low content of $SiO_2$ in the ceramic matrix, which is maximum 25%, expressed as Si element, the composition according to the present invention may be used for making casting moulds, in particular for casting magnesium alloys.

Examples of compositions of a ceramic layer for manufacturing a casting mould according to the present invention.

Example 1

A composition of a ceramic layer for manufacturing a casting mould intended for making castings of brass, bronze, cast iron and cast steel.

Composition of ceramic layer I (% by weight):
  liquid ceramic mass I: 28% of a binder-an aqueous solution of colloidal silica containing 30% of $SiO_2$+modifiers and 72% of a ceramic material comprising 90% of particles having a diameter less than 0.04 mm, and the following phase composition: 62% of forsterite $Mg_2SiO_4$, 14% of fayalite $Fe_2SiO_4$ and 24% of other components;
  a ceramic material for sprinkling: with particle-size distribution 0.1-0.3 mm, and phase composition: 62% of forsterite $Mg_2SiO_4$, 14% of fayalite $Fe_2SiO_4$, 24% of other phase components.

Composition of ceramic layer II (% by weight):
  liquid ceramic mass II: 30% of a binder-hydrolyzed ethyl silicate 40 (aqueous-alcoholic solution of colloidal silica containing 16% of $SiO_2$) and 70% of a ceramic material comprising 90% of particles having a diameter less than 0.04 mm, and the following phase composition: 62% of forsterite $Mg_2SiO_4$, 14% of fayalite $Fe_2SiO_4$, 24% of other phase components;
  a ceramic material for sprinkling: with particle-size distribution 0.1-0.3 mm, and the following phase composition: 62% of forsterite $Mg_2SiO_4$, 14% of fayalite $Fe_2SiO_4$ and 24% of other phase components.

Composition of ceramic layer III and subsequent ceramic layers (% by weight):
  liquid ceramic mass-having a composition as in layer I or II,
  a ceramic material for sprinkling: with particle-size distribution 0.4-1.0 mm and the phase composition: 62% of forsterite $Mg_2SiO_4$, 14% of fayalite $Fe_2SiO_4$, 24% of other phase components.

A method of making a casting mould:

A method of making layer I of the mould: The components of the liquid ceramic mass are blended in a mixer for 24 hours. Wax models are dipped in the obtained slurry being liquid ceramic mass having an apparent viscosity of 300 cP (measured with a Ford cup ϕ=5 mm), then after the models have been removed and excessive amount of the liquid ceramic mass has dripped off, they are sprinkled with the ceramic material at the subsequent workstation. Layer I of the ceramic mould is dried under conditions of natural convection for 8 hours.

A method of making layer II of the mould: The components of the liquid ceramic mass are blended in a mixer for 24 hours. Wax models are dipped in the obtained slurry being liquid ceramic mass having an apparent viscosity of 250 cP (measured with a Ford cup ϕ=5 mm), then after the models have been removed and excessive amount of the liquid ceramic mass has dripped off, the models are thoroughly sprinkled with the ceramic material at the subsequent workstation. Layer II of the ceramic mould is dried under conditions of natural convection for 8 hours.

A method of making subsequent layers, from III to X, of the casting mould: The layers are made alternately of liquid ceramic mass I and II. After the models with two ceramic layers already applied have been dipped in the slurry and excessive amount thereof has dripped off, the models should be thoroughly sprinkled with the ceramic material with particle-size distribution 0.4 mm to 1.0 mm at the subsequent workstation. Upon applying each layer, it must be dried under conditions of natural convection for at least 8 hours. The last layer of the mould is made of liquid ceramic mass I having a viscosity of 250 cP, but without sprinkling it with the ceramic material. Upon applying all layers, the mould is dried for 24 hours and then the wax model is removed in a high-pressure autoclave. The resultant mould, after being dried again and baked at the temperature of 900° C. for brass or bronze and 1100° C. for cast iron or cast steel, is filled with liquid metal.

Example 2

A composition of a ceramic layer for manufacturing a casting mould intended for making castings of aluminum alloys.

Composition of ceramic layer I (% by weight):
  liquid ceramic mass I: 30% of a binder-an aqueous solution of colloidal zircon oxide containing 18% of $ZrO_2$+modifiers and 70% of a ceramic material comprising 90% of particles having a diameter less than 0.04 mm, and the following phase composition: 48% of forsterite $Mg_2SiO_4$, 10% of fayalite $Fe_2SiO_4$, 42% of other components;
  a ceramic material for sprinkling: with particle-size distribution 0.1-0.3 mm and the following phase composition: 62% of forsterite $Mg_2SiO_4$, 10% of fayalite $Fe_2SiO_4$, 28% of other components.

Composition of ceramic layer II (% by weight):
  liquid ceramic mass II: 32% of a binder-an aqueous solution of colloidal zircon oxide containing 18% of $ZrO_2$+ modifiers, and 68% of a ceramic material comprising 90% of particles having a diameter less than 0.04 mm, and the following phase composition: 65% of forsterite $Mg_2SiO_4$, 10% of fayalite $Fe_2SiO_4$, 25% of other components;
  a ceramic material for sprinkling: with particle-size distribution 0.1-0.3 mm and the following phase composition: 65% of forsterite $Mg_2SiO_4$, 10% of fayalite $Fe_2SiO_4$, 25% of other components.

Composition of ceramic layer III and subsequent ceramic layers (% by weight):
  liquid ceramic mass: having a composition as in layer I or II,
  a ceramic material for sprinkling: with particle-size distribution 0.4-1.0 mm and the phase composition as for sprinkling of layers I and II.

A method of making:

A method of making layer I of the mould: The components of the liquid ceramic mass are blended in a mixer for 24 hours. A wax model is dipped in the obtained slurry being liquid ceramic mass having an apparent viscosity of 300 cP (measured with a Ford cup ϕ=5 mm), then after the model has been removed from the slurry and excessive amount of the liquid ceramic mass has dripped off, the model is thoroughly sprinkled with the ceramic material at the subsequent workstation. The first layer of the ceramic mould is dried under conditions of natural convection for about 8 hours.

A method of making layer II of the mould: The components of liquid ceramic mass II are blended in a mixer for 24 hours. A wax model is dipped in the obtained slurry having an apparent viscosity of 200 cP (measured with a Ford cup φ=5 mm), and then after the model has been removed and excessive amount of the liquid ceramic mass has dripped off, the model is sprinkled with the ceramic material with particle-size distribution 0.1 to 0.3 mm at the subsequent workstation. It is the second layer of the ceramic mould that is dried under conditions of natural convection for about 8 hours.

A method of making subsequent layers (III to X) of the ceramic mould:

These layers are made alternately of liquid ceramic mass I and II. After the model with two ceramic layers already applied has been dipped in the liquid ceramic mass slurry and removed, and excessive amount of the liquid mass has dripped off, the model is sprinkled with the ceramic material with particle-size distribution 0.4 mm to 1.0 mm at the subsequent workstation. Each layer is dried under conditions of natural convection for at least 8 hours. The last layer of the mould is made of liquid ceramic mass I having a viscosity of 300 cP, but without sprinkling it with the ceramic material. Upon applying all layers, the mould is dried for 24 hours and then the wax model is removed in a high-pressure autoclave. The resultant mould, after being dried again and baked at the temperature of about 800° C., is cooled to the temperature of 250° C. and then filled with liquid aluminum alloy.

Lowering the temperature of the mould enables rapid and directional solidification and self-cooling of castings as well as obtaining an advantageous fine-grained structure of a casting having high strength.

Example 3

A composition of a ceramic layer for manufacturing a casting mould intended for making castings of magnesium alloys.

Composition of Ceramic Layer I (% by Weight):
 liquid ceramic mass: 30% of a binder-an aqueous solution of colloidal zircon oxide containing 18% of $ZrO_2$+modifiers and 70% of a ceramic material comprising 90% of particles having a diameter less than 0.04 mm, and the following phase composition: 75% of forsterite $Mg_2SiO_4$, 10% of fayalite $Fe_2SiO_4$, 15% of other components;
 a ceramic material for sprinkling: with particle-size distribution 0.1 to 0.3 mm and the phase composition: 62% of forsterite $Mg_2SiO_4$, 12% of fayalite $Fe_2SiO_4$, 26% of other phase components.

Composition of Ceramic Layer II (% by Weight):
 liquid ceramic mass II: 32% of a binder-an aqueous solution of colloidal zircon oxide containing 18% of $ZrO_2$+ modifiers and 68% of a ceramic material comprising. 90% of particles having a diameter less than 0.04 mm, and the following phase composition: 62% of forsterite $Mg_2SiO_4$, 12% of fayalite $Fe_2SiO_4$, 26% of other components.

Composition of Ceramic Layer III and Subsequent Ceramic Layers (% by Weight):
 liquid ceramic mass-having a composition as in layer I or II;
 a ceramic material for sprinkling: with particle-size distribution 0.4-1.0 mm and the phase composition as for sprinkling of layers I and II.

A method of making a casting mould:

A method of making layer I of the mould: The components of liquid ceramic mass I are blended in a mixer for 24 hours. A wax model is dipped in the obtained liquid ceramic mass slurry having an apparent viscosity of 300 cP (measured with a Ford cup φ=5 mm), then after the model has been removed and excessive amount of the liquid mass has dripped off, the model is sprinkled with the ceramic material with particle-size distribution 0.1 to 0.3 mm at the subsequent workstation. This is the first layer of the ceramic mould that is dried under conditions of natural convection for about 8 hours.

A method of making layer II of the mould: The components of liquid ceramic mass II are blended in a mixer for 24 hours. A wax model is dipped in the obtained slurry having an apparent viscosity of 250 cP (measured with a Ford cup φ=5 mm), then after the model has been removed and excessive amount of the liquid ceramic mass has dripped off, the model is sprinkled with the ceramic material with particle-size distribution 0.1 to 0.3 mm at the subsequent workstation. This is the second layer of the ceramic mould that is dried under conditions of natural convection for about 8 hours.

A method of making subsequent layers (III to X) of the ceramic mould:

Subsequent layers are made alternately of liquid ceramic mass I and II. After the model with two ceramic layers already applied has been dipped in the liquid ceramic mass slurry and excessive amount thereof has dripped off, the model is sprinkled with the ceramic material with particle-size distribution 0.4 mm to 1.0 mm at the subsequent workstation. Each layer is dried under conditions of natural convection for at least 8 hours. The last layer of the mould is made of liquid ceramic mass I having a viscosity of 300 cP, but without sprinkling it with the ceramic material. Upon applying all layers, the mould is dried for 24 hours and then the wax model is removed in a high-pressure autoclave. The resultant mould, after being dried again and baked at the temperature of about 900° C., is cooled to the ambient temperature and then left for storage. If necessary, the moulds are taken out from the storage, heated to the temperature of 250-300° C., and then filled with liquid magnesium alloy.

Low temperature of the mould enables rapid and directional solidification and self-cooling of castings as well as obtaining an advantageous fine-grained structure of the casting having high strength.

Example 4

A composition of a ceramic layer for manufacturing other products—a ceramic crucible.

Composition of Ceramic Layer I (% by Weight):
 liquid ceramic mass I: 25% of a binder-a silicate binder containing 21% of $SiO_2$+modifiers and 75% of a ceramic material comprising 90% of particles having a diameter less than 0.04 mm, and the following phase composition: 87% of forsterite $Mg_2SiO_4$, 7% of fayalite $Fe_2SiO_4$, 6% of other components;
 a ceramic material for sprinkling: with particle-size distribution 0.1-0.3 mm, and the phase composition: 87% of forsterite $Mg_2SiO_4$, 7% of fayalite $Fe_2SiO_4$, 6% of other components.

Composition of Ceramic Layer II (% by weight):
 liquid ceramic mass II: 28% of a binder-a silicate binder containing 21% of $SiO_2$+modifiers and 72% of a ceramic material comprising 90% of particles having a diameter less than 0.04 mm, and the following phase composition: 87% of forsterite $Mg_2SiO_4$, 7% of fayalite $Fe_2SiO_4$, 6% of other components;

a ceramic material for sprinkling: with particle-size distribution 0.1-0.3 mm and the following phase composition: 87% of forsterite $Mg_2SiO_4$, 7% of fayalite $Fe_2SiO_4$, 6% of other phase components.

Composition of Ceramic Layer III and Subsequent Ceramic Layers (III To X) (% by Weight):

liquid ceramic mass—35% of a binder—a silicate binder containing 21% of $SiO_2$+modifiers and 65% of a ceramic material comprising 90% of particles having a diameter less than 0.04 mm, and the following phase composition: 87% of forsterite $Mg_2SiO_4$, 7% of fayalite $Fe_2SiO_4$, 6% of other components;

a ceramic material for sprinkling onto subsequent layers: with particle-size distribution 0.4-1.0 mm and the phase composition as in layers I and II.

A method of making a ceramic crucible:

A method of making layer I of the crucible: The components of liquid ceramic mass I are blended in a mixer for 24 hours. A wax model of the crucible is dipped in the obtained liquid ceramic mass slurry having an apparent viscosity of 350 cP (measured with a Ford cup (I)=5 mm), then after the model has been removed and excessive amount of the liquid mass has dripped off, the model is sprinkled with the ceramic material with particle-size distribution 0.1-0.3 mm at the subsequent workstation. This is the first layer of the ceramic crucible that is dried under conditions of natural convection for about 8 hours.

A method of making layer II of the crucible: The components of liquid ceramic mass II are blended in a mixer for 24 hours. A wax model of the crucible is dipped in the obtained liquid ceramic mass slurry having an apparent viscosity of 300 cP (measured with a Ford cup 4=5 mm), and then after the model has been removed and excessive amount of the liquid mass has dripped off, the model is sprinkled with the ceramic material with particle-size distribution 0.1-0.3 mm at the subsequent workstation. This is the second layer of the ceramic crucible that is dried under conditions of natural convection for about 8 hours.

A method of making subsequent layers (III to X) of the ceramic crucible:

Subsequent ceramic layers are made of liquid ceramic mass III having an apparent viscosity of the slurry (of the liquid ceramic mass) of 200 cP. The last layer is made of liquid ceramic mass II having a viscosity of 300 cP, but without sprinkling with the ceramic material. Upon applying all layers, the crucible is dried for 24 hours, and then the wax model shaping the crucible is removed in a high-pressure autoclave. The resultant raw crucible, after being dried again and baked at the temperature of 1250° C., is cooled to the ambient temperature and then left for storage.

If necessary, the products are taken out from the storage and used for operations at high temperature up to 1250° C., for instance for metal melting, filling casting moulds or baking ceramic materials.

What is claimed is:

1. A kit for producing a ceramic layer for manufacturing a casting mould, said kit comprising:
   I) a liquid ceramic mass consisting of A) 50-75% (w/w) of a mixed ceramic material and B) 25-50% (w/w) of a binder,
      A) wherein the mixed ceramic material has a phase composition comprising:
         i) 30-90% (w/w) of forsterite $Mg_2Sia_4$,
         ii) 5-15% (w/w) of fayalite $Fe_2Sia_4$, and
         iii) 5-65% (w/w) of one or more phase components selected from the group consisting of chrysolite $2(Mg_{0.88}Fe_{0.12})SiO_2$, enstatite $MgSiO_3$, tremolite $Ca_2Mg_5Si_8O_{22}(OH)_2$, ringwoodite $(Mg,Fe)_2[SiO_4]$ and diopside $Ca(Mg,Al)(Si,Al)_2O_6$, and
      wherein the mixed ceramic material has a particle-size distribution comprising a minimum of 90% of particles with a size of less than 0.04 mm; and
      B) wherein the binder comprises an aqueous or aqueous-organic colloidal solution of a metallic oxide and modifiers, and
   II) a sprinkled ceramic material having a phase composition comprising:
      A) 30-90% (w/w) of forsterite $Mg_2Sia_4$,
      B) 5-15% (w/w) of fayalite $Fe_2SiO_4$, and
      C) 5-65% (w/w) of one or more phase components selected from the group consisting of chrysolite $2(Mg_{0.88}Fe_{0.12})SiO_2$, enstatite $MgSiO_3$, tremolite $Ca_2Mg_5Si_8O_{22}(OH)_2$, ringwoodite $(Mg,Fe)_2[SiO_4]$ and diopside $Ca(Mg,Al)(Si,Al)_2O_6$.

2. The kit of claim 1, wherein the content of chrysolite $2(Mg_{0.88}Fe_{0.12})SiO_2$ in the sprinkled ceramic material is present at a maximum of 25% by weight, expressed as Si element.

3. A method for producing a ceramic layer for manufacturing a casting mould using a kit as claimed in claim 1, the method comprising a steps of:
   A) blending the liquid ceramic mass in a mixer for 24 hours,
   B) dipping a wax model in the blended liquid ceramic mass,
   C) removing a formulated layer from the blended liquid ceramic mass and allowing any excessive amount of the liquid ceramic mass to drip off, and
   D) adding the sprinkled ceramic material to the formulated layer.

4. The method of claim 3 further comprising step E) drying the formulated layer under conditions of natural convection after the completion of step D.

5. The method of claim 4 wherein the drying step E) is for about 8 hours.

* * * * *

UNITED STATES PATENT AND TRADEMARK OFFICE
CERTIFICATE OF CORRECTION

PATENT NO. : 9,242,292 B2
APPLICATION NO. : 14/432949
DATED : January 26, 2016
INVENTOR(S) : Zbigniew Stefanski et al.

It is certified that error appears in the above-identified patent and that said Letters Patent is hereby corrected as shown below:

Claims

Column 8, Claim 1, Line 13, please delete "$Sia_4$" and insert --$SiO_4$--.

Column 8, Claim 1, Line 27, please delete "$Sia_4$" and insert --$SiO_4$--.

Signed and Sealed this
Twenty-sixth Day of April, 2016

Michelle K. Lee
*Director of the United States Patent and Trademark Office*